INVENTOR.
THOMAS L. DALE
BY Schmieding and Fritts
ATTORNEYS

March 12, 1963 T. L. DALE 3,080,911
METHOD AND APPARATUS FOR APPLYING ADHESIVE
BACKINGS TO ARTICLES
Filed March 17, 1960 3 Sheets-Sheet 3

INVENTOR.
THOMAS L. DALE
BY Schmieding and Fultz
ATTORNEYS

3,080,911
METHOD AND APPARATUS FOR APPLYING ADHESIVE BACKINGS TO ARTICLES
Thomas L. Dale, Columbus, Ohio, assignor, by mesne assignments, to Jack Miller, Meyer Young, Sanford Novak, Mickey Adelman, and Harry Adelman, Cleveland, Ohio
Filed Mar. 17, 1960, Ser. No. 15,741
11 Claims. (Cl. 156—518)

This invention relates to a machine for applying adhesive backings to articles.

In general, the machine of the present invention is adapted to successively advance a continuous strip of pressure sensitive adhesive type tape into and through an article receiving station.

Identical articles are successively positioned in the article receiving station and successively advanced lengths of the tape are applied to the articles to provide on each article a pressure sensitive adhesive backing covered with a pull-off type protective cover which when subsequently removed exposes the pressure sensitive adhesive layer on the back of the article.

In accordance with the present invention when an adhesive backing is applied to an article the machine serves to trim away the excess portion of the tape that surrounds the backing portion applied to the article.

As another aspect of the machine of the present invention the pressure sensitive tape is removed from a storage means and advanced through the article receiving station by means of a novel arrangement of endless perforated belts and vacuum chambers that effectively grip and position the tape relative to the articles to which it is applied.

It is therefore an object of the present invention to provide a machine for applying adhesive type backings to articles at high rates of production.

It is another object of the present invention to provide a novel die means for applying adhesive type backings to small mirrors or other thin fragile articles.

Further objects and advantages of the present invention will be apparent from the following description, reference being had to the accompanying drawings wherein a preferred form of embodiment of the invention is clearly shown.

Figure 1:
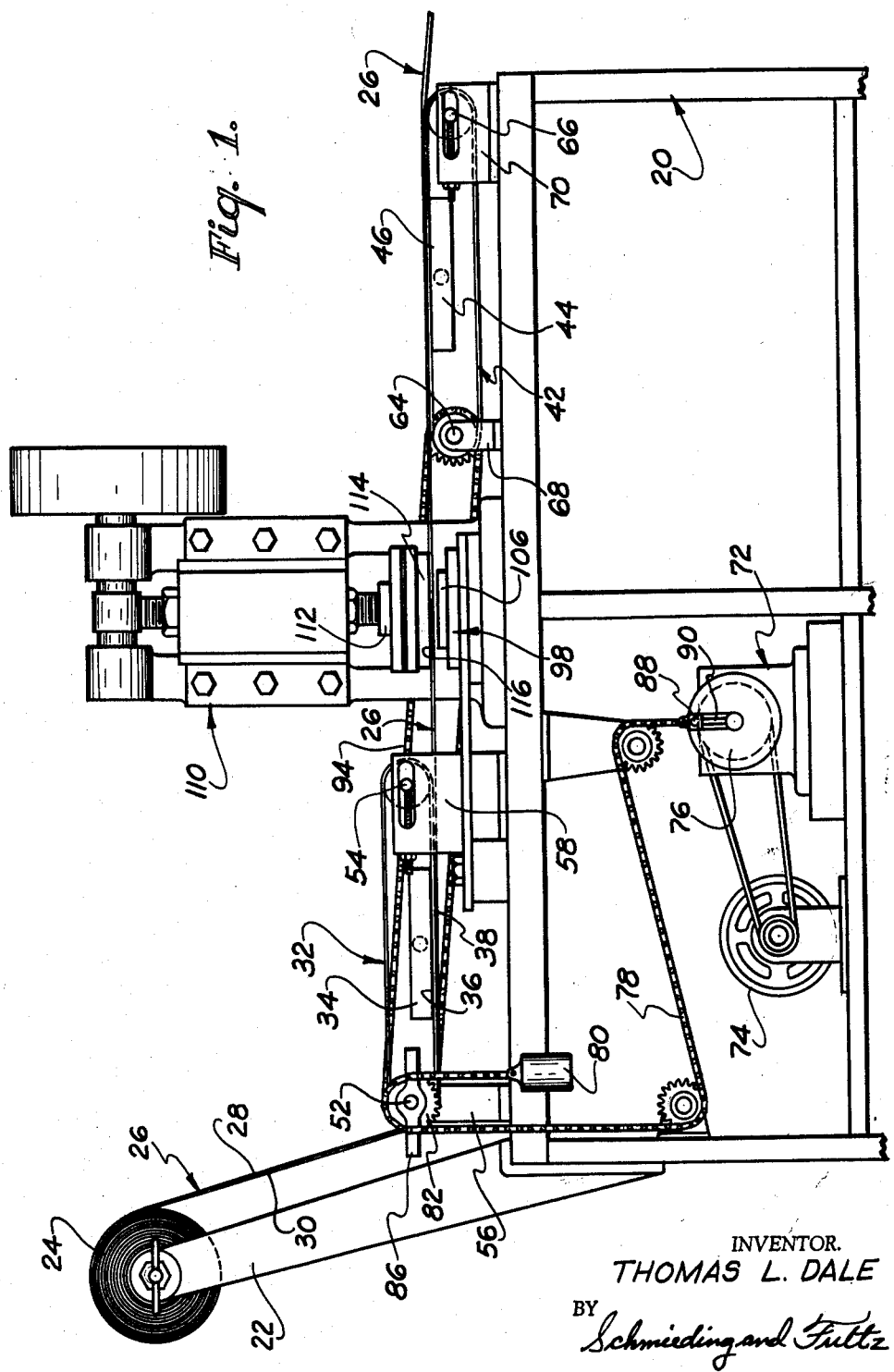
FIG. 1 is a front elevational view of a machine for applying adhesive backings to articles, said machine being constructed in accordance with the present invention.
Figure 2:
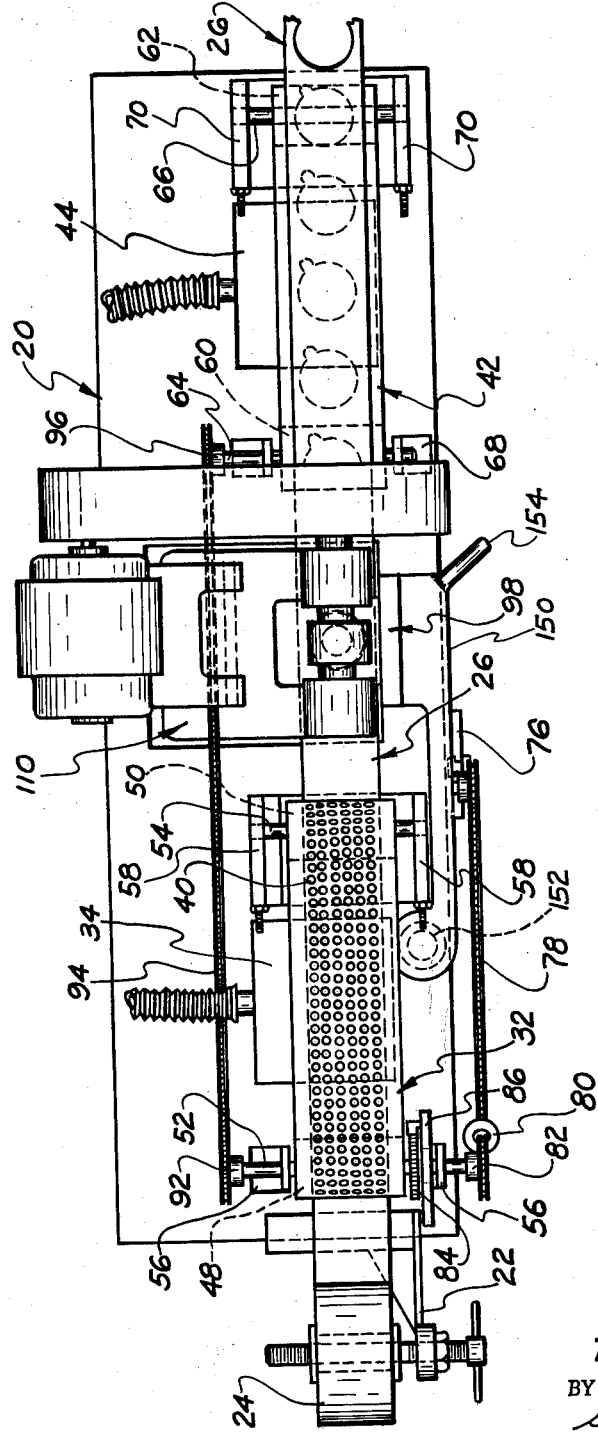
FIG. 2 is a top elevational view of the machine of FIG. 1.

Referring in detail to the drawings, a machine constructed in accordance with the present invention is illustrated in FIGS. 1 and 2 and includes a frame indicated generally at 20.

A vertical support 22 rotatably mounts a roll 24 of pressure sensitive tape indicated generally at 26. One side of the tape includes a paper backing 28 that overlies a strip of pressure sensitive adhesive material 30.

Tape 26 passes under a first endless perforated belt indicated generally at 32.

A vacuum chamber 34 includes an open bottom side 36 that confronts the inner surface of a lower horizontally extending length 38 of perforated belt 32. A plurality of perforations 40 continuously form passages between the interior of a vacuum chamber 34 and the upper or paper side 28 of tape 26 whereby the tape is gripped and advanced when perforated belt 32 is being driven.

A second endless perforated belt indicated generally at 42 and a second vacuum chamber 44 includes an open top side 46.

The perforations in belt 42 form passages that connect the lower or adhesive side of tape 26 with the interior of vacuum chamber 44 whereby tape 26 is gripped and advanced whenever perforated belt 42 is operated.

Perforated belt 32 surrounds drums 48 and 50 which are mounted on the frame by shafts 52 and 54, the latter being journaled in bearings carried by upright brackets 56 and 58.

Similarly perforated belt 42 is mounted on pulleys 60 and 62 mounted on shafts 64 and 66, the latter being rotatably carried by bearings supported by upright brackets 68 and 70.

Perforated belt 32 is intermittently driven by a one revolution clutch assembly indicated generally at 72, the latter being in turn driven by an electric motor 74.

While a disc 76 of one revolution clutch assembly 72 rotates through 180 degrees, it rotates an adjustable anchor block 88 downwardly and thereby moves a roller chain 78 in one direction so as to lift weight 80. During such first 180 degrees of rotation, a sprocket 82 drives a ratchet wheel 84 by means of a ratchet finger 86. Ratchet wheel 84 is keyed to shaft 52 and hence drives pulley 48 and advances perforated belt 32.

After clutch 72 reaches the 180 degree position, chain 78 reverses its direction and weight 80 moves downwardly to its initial position illustrated in FIG. 1 at which time rotation of clutch disk 76 terminates. While weight 80 is moving downwardly during rotation of clutch disk 76 between the 180 degree position and the 360 degree position ratchet wheel 84 remains stationary since ratchet finger 86 slips backwards along the ratchet teeth on ratchet wheel 84.

Operation of one revolution clutch assembly 72 is initiated by the operator of the machine. For example, the clutch can be energized by the same control lever that institutes operation of the punch press 110.

The length of tape 26 that is advanced by each cycle of operation of one revolution clutch assembly 72 can be adjusted by varying the position of adjustable chain anchor block 88 along slide 90. It will be understood that if anchor block 88 is moved radially inwardly along slot 90 than chain 78 and weight 80 will be moved a lesser distance and perforated belt 32 will advance tape 26 by a corresponding lesser amount.

Whenever the shaft 52 of perforated belt 32 is driven the shaft 64 of perforated belt 42 is also driven by sprocket 92, roller chain 94, and sprocket 96, said sprocket being keyed to the respective shafts.

With reference to FIGS. 1–4, a die indicated generally at 98 is supported by a pivoted arm 150 mounted to frame 20 at a vertical pivot bearing 152. In FIGS. 1 and 2, die 98 is shown located under a pressure applying surface 116 of a movable die member 114.

When the operator wishes to load die 98, he merely grasps handle 154 and swings arm 150 outwardly from under tape 26 and movable die member 114. This makes a resilient article supporting member 102 accessible for the rapid loading of articles.

Figure 3:
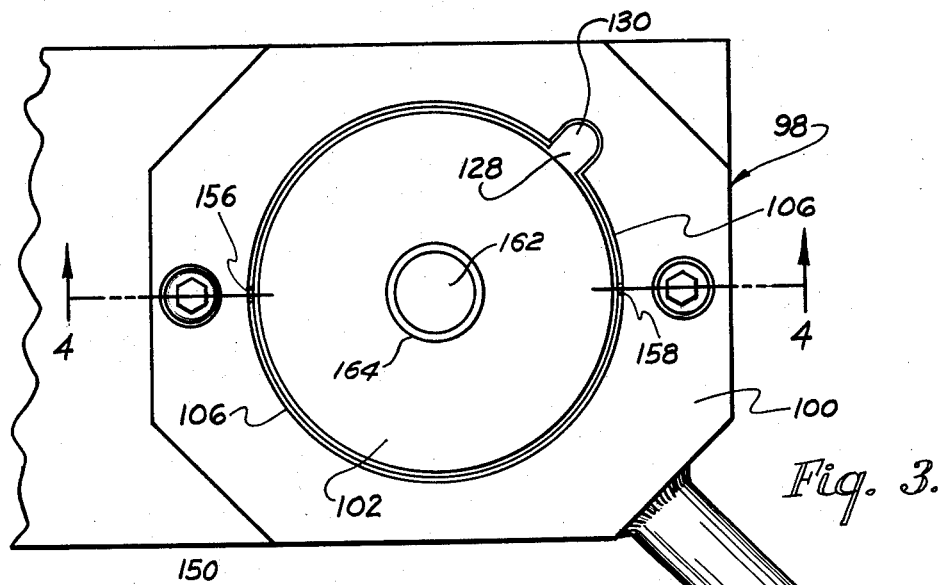
FIG. 3 is a top elevational view of a die comprising a portion of the machine of the preceding figures.
Figure 4:
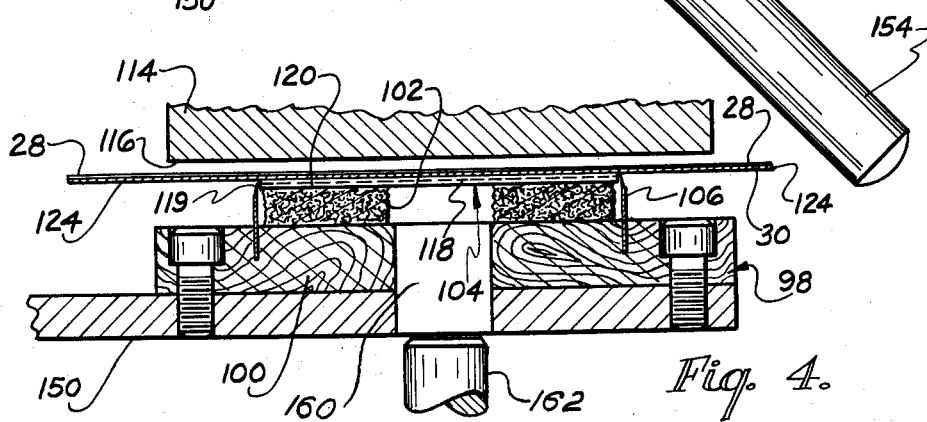
FIG. 4 is a side sectional view of the die of FIG. 3 the section being taken along the line 4—4 of FIG. 3.

With reference to FIGS. 3 and 4, resilient article supporting member 102 is formed of a sheet of sponge rubber, or the like, cemented to a base block 100 which is in turn secured to movable arm 150 by a plurality of cap screws.

Figure 5:
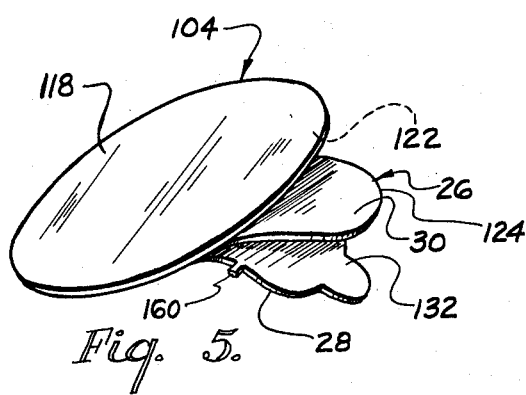
FIG. 5 is a perspective view of a mirror provided with a pressure sensitive tape backing by means of the machine and die means of the present invention.

The diameter of resilient article supporting member 102 is substantially equal to the diameter of a glass mirror indicated generally at 104 in FIG. 5.

Base block 100 further supports a circular cutter 106 provided with an upper knife edge 108, the diameter of circular cutter 106 being slightly greater than the diameter of mirror 104.

With reference to FIG. 3, the circular shape of cutter 106 is discontinued at 128 and the ends of the circular segment join with the ends of legs of a U-shaped cutter portion 130, which legs extend radially outwardly from cutter 106. It will be understood that discontinuance 128 and U-shaped cutter 130 serve to cut a tab 132 which extends radially outwardly from the peripheral edge of mirror 104. Tab 132 provides means for gripping the removable backing paper so that it can be readily pulled off of pressure sensitive material 124 when it is desired to use the pressure sensitive material 124 to attach the mirror 104 to a supporting surface.

With reference to FIGS. 3 and 4, knife edge 119 of circular cutter 106 includes two shallow notches 156 and 158 that leave two uncut connecting portions between the section of backing material applied to the article and the surrounding portion of the tape 26. One of such connecting portions is illustrated at 160 in FIG. 5. The connecting portions are provided to maintain the mirror 104 and its backing in position relative to the surrounding portion of tape 26 as the mirror leaves the die, with the surrounding tape, and progresses onto and along the second perforated belt 42.

The central portions of base block 100 and resilient article supporting member 102 are provided with a hole 160 that receives an ejector pin 162, the latter being upwardly movable into engagement with mirror 104 to lift same above knife edge 119 so that the mirror will not be torn away from tape 26 when the tape is advanced. Ejector pin 162 is connected to the punch press mechanism by apparatus not illustrated so that the ejector pin is automatically moved upwardly along with ram 112 of punch press 110.

With reference to FIG. 1, a bench type punch press indicated generally at 110 includes a ram 112 on the lower end of which is affixed an upper die portion 114 that includes a lower pressure applying surface 116.

In operation, handle 154 is manipulated to swing arm 150 outwardly and move die 98 away from movable die member 114. A mirror 104 is placed on the top of resilient article supporting member 102 with the reflective side 118 of the mirror turned face downwardly and in contact with the upper surface 120 of resilient article supporting member 102. The coated side 122 of mirror 104 faces upwardly and confronts the adhesive side 30 of tape 26.

Punch press 110 is next energized so as to drive ram 112 downwardly whereby pressure applying surface 116 presses tape 26 against the coated side 122 of mirror 104. This causes the adhesive side 30 of pressure sensitive material 124, FIG. 5, to adhere to the coated side 122 of mirror 104.

The movement of ram 112 downwardly also causes pressure applying surface 116 of die member 114 to press tape 26 against knife edge 119 of circular cutter 106 whereby the portion of the tape being applied to the back of the mirror is severed around the peripheral edge of the mirror except at the interconnecting portion 160, previously described.

After pressure has been applied to the portion of tape 26 overlying mirror 104 and after the tape has been severed around the periphery of the mirror ram 112 is moved upwardly. One revolution clutch 72 is next activated to drive perforated belts 32 and 42 and thereby advance a new length of tape 26 to a position overlying resilient article supporting member 102. At the same time, advancement of the tape moves the previously backed mirror, retained to the surrounding portion of tape 26 by connectors 160, towards second perforated belt 42.

The operator next actuates handle 154 to move article 150 outwardly to the previously mentioned loading position. A new mirror is next positioned in die 98 and article 150 is swung back to the pressure applying position illustrated in FIGS. 1 and 2.

As the above described cycle is repeated, the backed mirrors, retained to surrounding portions of tape 26 by connectors 160, move outwardly onto second perforated belt 42 at which location they are removed by tearing connectors 160.

While the forms of embodiment of the present invention as herein disclosed constitutes a preferred form, it is to be understood that other forms might be adopted, all coming within the scope of the claims which follow.

I claim:

1. A machine for applying adhesive backing to articles comprising, in combination, frame means; means for supplying a continuous strip of tape having an adhesive applied to one side thereof; a first endless belt mounted on said frame means and provided with a plurality of perforations, said strip of tape being extended along one side of said belt; a first stationary vacuum chamber including an open side extending along the other side of said first belt, said perforations forming passages that expose one side of said tape to said first vacuum chamber; a second endless belt mounted on said frame means and provided with a plurality of perforations, said strip of tape being extended along one side of said second belt; a second stationary vacuum chamber including an open side extending along the other side of said second belt, said perforations forming passages that expose one side of said tape to said second vacuum chamber; power means for driving said endless belts along said open sides of said stationary vacuum chambers; means forming an article receiving station between said first and second endless belts for positioning an article along the adhesive side of said tape; a resilient member in said article receiving station; and cutter means surrounding said resilient member for severing said tape along the edge of an article positioned in said station and forming an article locating shoulder extended above said resilient member.

2. A machine for applying adhesive backing to articles comprising, in combination, frame means; means for supplying a continuous strip of tape having an adhesive applied to one side thereof; a first endless belt mounted on said frame means and provided with a plurality of perforations, said strip of tape being extended along one side of said belt; a first stationary vacuum chamber including an open side extending along the other side of said first belt, said perforations forming passages that expose one side of said tape to said first vacuum chamber; a second endless belt mounted on said frame means and provided with a plurality of perforations, said strip of tape being extended along one side of said second belt; a second stationary vacuum chambers; die means positioned between said endless belts and including a resilient member for supporting an article adjacent the adhesive side of said said tape to said second vacuum chamber; power means for driving said endless belts along said open sides of said stationary vacuum chambers; die means positioned between said endless belts and including a resilient member for supporting an article adjacent the adhesive side of said tape and a cutting edge surrounding said resilient member and forming an article locating shoulder extended above said resilient member; means forming a pressure applying surface on the other side of said tape; and means for imparting relative movement between said die means and said pressure applying surface.

3. A machine for applying adhesive backing to articles comprising, in combination, frame means; means for supplying a continuous strip of tape having an adhesive applied to one side thereof; an endless belt mounted on said frame means and provided with a plurality of perforations, said strip of tape being extended along one side of said belt; a stationary vacuum chamber including an open side extending along the other side of said belt, said perforations forming passages that expose one side of said tape to said vacuum chamber; power means for driving said belt along said open side of said stationary vacuum chamber; tape guiding means spaced from said belt; means forming an article receiving station between said belt and said tape guiding means; a resilient member in said article receiving station; and cutter means surrounding said resilient member for severing said tape along the edge of an article positioned in said station and forming an article locating shoulder extended above said resilient member.

4. A machine for applying adhesive backing to articles comprising, in combination, frame means; means for supplying a continuous strip of tape having an adhesive applied to one side thereof; an endless belt mounted on said frame means and provided with a plurality of perforations, said strip of tape being extended along one side of said belt; a stationary vacuum chamber including an open side extending along the other side of said belt, said perforations forming passages that expose one side of said tape to said vacuum chamber; power means for driving said endless belt along said open side of said stationary vacuum chamber; tape guiding means spaced from said belt; die means positioned between said belt and said tape guiding means and including a resilient member for supporting an article adjacent the adhesive side of said tape and a cutting edge surrounding said resilient member and forming an article locating shoulder extended above said resilient member; means forming a pressure applying surface on the other side of said tape; and means for imparting relative movement between said die means and said pressure applying surface.

5. A machine for applying adhesive backing to articles comprising, in combination, frame means; means for supplying a continuous strip of tape having an adhesive applied to one side thereof; a first tape guiding and advancing means including a movable perforated surface forming apertures communicating with a vacuum chamber; a second tape guiding and advancing means including a movable perforated surface forming apertures communicating with a vacuum chamber; die means positioned between said first and second tape guiding and advancing means, said die means including a resilient article supporting member and a cutting edge at least partially surrounding said resilient member and forming an article locating shoulder extended above said resilient member; means forming a pressure applying surface on the side of said tape opposite said die means; means for imparting relative movement between said die means and said pressure applying surface; and power means for intermittently actuating and stopping said tape guiding and advancing means to successively advance and stop said strip of tape in said article receiving station.

6. The apparatus defined in claim 5 wherein a second cutting edge extends outwardly from a discontinuance in said first mentioned cutting edge, said second cutting edge serving to form a tab of tape material that extends outwardly from an edge of said article.

7. A machine for applying adhesive backing to articles comprising, in combination, frame means; means for supplying a continuous strip of tape having an adhesive applied to one side thereof; a first endless belt mounted on said frame means and provided with a plurality of perforations, said strip of tape being extended along one side of said belt; a first vacuum chamber including an open side extending along the other side of said first belt, said perforations forming passages that expose one side of said tape to said first vacuum chamber; a second endless belt mounted on said frame means and provided with a plurality of perforations, said strip of tape being extended along one side of said second belt; a second vacuum chamber including an open side extending along the other side of said second belt, said perforations forming passages that expose one side of said tape to said second vacuum chamber; means forming an article receiving station between said first and second endless belts for positioning an article along the adhesive side of said tape; and cutter means for severing said tape along the edge of an article positioned in said station; and power means for driving said endless belts including apparatus for intermittently actuating and stopping said endless belts to successively advance and stop said strip of tape in said article receiving station.

8. A machine for applying adhesive backing to articles comprising, in combination, frame means; means for supplying a continuous strip of tape having an adhesive applied to one side thereof; a first endless belt mounted on said frame means and provided with a plurality of perforations, said strip of tape being extended along one side of said belt; a first vacuum chamber including an open side extending along the other side of said first belt, said perforations forming passages that expose one side of said tape to said first vacuum chamber; a second endless belt mounted on said frame means and provided with a plurality of perforations, said strip of tape being extended along one side of said second belt; a second vacuum chamber including an open side extending along the other side of said second belt, said perforations forming passages that expose one side of said tape to said second vacuum chamber; die means positioned between said endless belts and including a resilient member for supporting an article adjacent the adhesive side of said tape and a cutting edge surrounding said resilient member; means forming a pressure applying surface on the other side of said tape; and means for imparting relative movement between said die means and said pressure applying surface; and power means for driving said endless belts including apparatus for intermittently actuating and stopping said endless belts to successively advance and stop said strip of tape in said article receiving station.

9. A machine for applying adhesive backing to articles comprising, in combination, frame means; means for supplying a continuous strip of tape having an adhesive applied to one side thereof; an endless belt mounted on said frame means and provided with a plurality of perforations, said strip of tape being extended along one side of said belt; a vacuum chamber including an open side extending along the other side of said belt, said perforations forming passages that expose one side of said tape to said vacuum chamber; tape guiding means spaced from said belt; means forming an article receiving station between said belt and said tape guiding means; and cutter means for severing said tape along the edge of an article positioned in said station; and power means for driving said endless belt including apparatus for intermittently actuating and stopping said endless belt to successively advance and stop said strips of tape in said article receiving station.

10. A machine for applying adhesive backing to articles comprising, in combination, frame means; means for supplying a continuous strip of tape having an adhesive applied to one side thereof; an endless belt mounted on said frame means and provided with a plurality of perforations, said strip of tape being extended along one side of said belt; a vacuum chamber including an open side extending along the other side of said belt, said perforations forming passages that expose one side of said tape to said vacuum chamber; tape guiding means spaced from said belt; die means positioned between said belt and said tape guiding means and including a resilient member for supporting an article adjacent the adhesive side of said tape and a cutting edge surrounding said resilient member; means forming a pressure applying surface on the other side of said tape; and means for imparting relative movement between said die means and said pressure applying surface; and power means for driving said endless belt including apparatus for intermittently actuating and stopping said endless belt to successively advance and stop said strip of tape in said article receiving station.

11. A machine for applying adhesive backing to articles comprising, in combination, frame means; means for supplying a continuous strip of tape having an adhesive applied to one side thereof; a first tape guiding and advancing means including a movable perforated surface forming apparatus communicating with a vacuum chamber; a second tape guiding and advancing means including a movable perforated surface forming apparatus communicating with a vacuum chamber; a first pressure applying member mounted between said tape guiding and advancing means; a second pressure applying member mounted between said tape guiding and advancing means, one of said members including a resilient article engaging surface; cutter means on one of said pressure applying members and in at least partial surrounding relationship with said resilient article engaging surface; means for imparting relative movement between said first and second pressure applying members; and power means for intermittently actuating and stopping said tape guiding and advancing means to successively advance and stop said strip of tape in said article receiving station.

References Cited in the file of this patent

UNITED STATES PATENTS

| | | |
|---|---|---|
| 2,362,168 | Stokes | Nov. 7, 1944 |
| 2,675,851 | Mutte | Apr. 20, 1954 |
| 2,723,604 | Fischer | Nov. 15, 1955 |
| 2,789,640 | Belden | Apr. 23, 1957 |